United States Patent
Bank et al.

(10) Patent No.: US 8,214,194 B2
(45) Date of Patent: *Jul. 3, 2012

(54) PERFORMING DYNAMIC SIMULATIONS WITHIN VIRTUALIZED ENVIRONMENT

(75) Inventors: Judith H. Bank, Cary, NC (US); James N. Chen, Austin, TX (US); Steven E. Froehlich, Danbury, CT (US); Karl R. Huppler, Mantorville, MN (US); Elisabeth R. Stahl, Shaker Heights, OH (US)

(73) Assignee: International Business Machines Corporation, Armonk, NY (US)

(*) Notice: Subject to any disclaimer, the term of this patent is extended or adjusted under 35 U.S.C. 154(b) by 160 days.

This patent is subject to a terminal disclaimer.

(21) Appl. No.: 12/502,815

(22) Filed: Jul. 14, 2009

(65) Prior Publication Data

US 2009/0276787 A1 Nov. 5, 2009

Related U.S. Application Data

(63) Continuation of application No. 11/241,696, filed on Sep. 30, 2005, now Pat. No. 7,562,003.

(51) Int. Cl.
*G06F 9/45* (2006.01)
(52) U.S. Cl. .................... 703/22; 709/201; 718/105
(58) Field of Classification Search ............... 703/13, 703/20, 22; 709/201, 202, 226; 718/105
See application file for complete search history.

(56) References Cited

U.S. PATENT DOCUMENTS 7,562,003 B2 7/2009 Bank et al.
2005/0259683 A1 11/2005 Bishop et al.

OTHER PUBLICATIONS

Karatyza et al., Scheduling a Job Mix in a Partitionable Parallel System, IEEE 35$^{th}$ Annual Simulation Symposium, 2002, pp. 115-121.*
Huang, J.P. Modeling of Software Partition for Distributed Real-Time Applications, IEEE Transactions on Software Engineering, 1985, pp. 1113-1126.*
Channon et al., Performance Analysis of Re-configurable Partitioned TLBs, Proceedings of the 30$^{th}$ Hawaii International Conference on System Sciences, 1997, pp. 168-177.*
J. Zhang et al., Synthesizing Representative I/O Workloads for TCP-H, Proceedings of the 10th Int. Symposium on High Performance Computer Architecture, Feb. 2004, pp. 142-151.
Office Action dated Sep. 30, 2008 for U.S. Appl. No. 11/241,696.

* cited by examiner

*Primary Examiner* — Russell Frejd
(74) *Attorney, Agent, or Firm* — Patterson & Sheridan LLP

(57) ABSTRACT

A method and apparatus for and article of manufacture for simulating workloads experienced by multiple partitions in a virtualized system are provided. A master workload driver initiates, coordinates and regulates one or more workload drivers that execute one or more workload simulation tasks in a logical partition. Further, each workload driver may be configured to report a measure of performance regarding the workload to the master control driver where results of many workload drivers may be correlated and analyzed. A configuration file specifies the characteristics of each simulation. Further, the rate and nature of workloads may be adjusted dynamically during a given simulation to model the performance under different real-world scenarios of different computational loads that may be experienced by the virtualized system.

16 Claims, 6 Drawing Sheets

PERFORMING DYNAMIC SIMULATIONS WITHIN VIRTUALIZED ENVIRONMENT

CROSS-REFERENCE TO RELATED APPLICATIONS

This application is a continuation of U.S. patent application Ser. No. 11/241,696, filed Sep. 30, 2005, now U.S. Pat. No. 7,562,003 which is herein incorporated by reference in its entirety.

BACKGROUND OF THE INVENTION

1. Field of the Invention

The present invention generally relates to data processing. More particularly, the present invention relates to techniques for benchmarking the performance of multiple logical partitions in a logically partitioned computer system.

2. Description of the Related Art

Virtualization is a technique used to divide a collection of physical computing resources into one or more logical partitions. In a virtualized environment, the computing resources of many systems and data storage units may be gathered into "pools" of computing power that can easily be allocated as demands on the system change. From such a "pool," any number of partitions may be defined. Thus, virtualization provides an abstraction of computing power, data storage, network communications, and other computing resources.

In a virtualized environment, each partition behaves in some respects as a separate computer system. Virtualization allows users to derive more value from a computer system by increasing both system utilization and throughput. Moreover, because each partition is an abstraction of a physical computer system, the resources allocated to a given partition may easily be modified. Similarly, the physical resources underlying the partitions may be changed or expanded. Thus, a logically partitioned environment may be modified from either side (i.e., from the partition side or the hardware side) by modifying a logical partition or by modifying the underlying physical resources available to the virtualized environment.

As virtualized systems have become more prevalent, a need has arisen to demonstrate and characterize the performance of a virtualized environment. For example, a seller or manufacturer of a virtualized system may wish to provide a demonstration to potential buyers. Such a demonstration may include performing a workload simulation using the virtualized system. Similarly, potential purchasers may require certain, provable performance characteristics of the virtualized system. To be meaningful, a benchmark, or system workload simulation performed against a virtualized system, must provide dynamic, repeatable, and verifiable measures of performance both for an individual partition, and for the system as a whole.

However, unlike current techniques used to perform workload simulations on a discrete computer system, virtualized environments require that multiple partitions participate in a workload simulation concurrently. Further, the workloads experienced by individual partitions should be able to be dynamically changed throughout a simulation. At the same time, system performance analysis (i.e. benchmarks) requires a highly controlled environment, where dynamic fluctuations in the workload processed by each partition may be carefully regulated and recorded. Current techniques for system performance benchmarking, however, have been largely ad-hoc attempts to correlate multiple workload simulations performed by a set of logical partitions. For example, an administrator may configure each partition to run a workload simulation individually. From this, some measure of overall system performance may be estimated.

At best however, this approach merely guesses at the actual performance of a virtualized system from a series of disconnected workload simulations. At worst, this approach devolves into a cumbersome task that forces a system administrator to attempt to coordinate the performance of workload simulations running on each partition, and then attempt some meaningful interpretation or measure of overall system performance. In any event, this ad-hoc approach of running independent simulations in multiple partitions fails to provide dynamic, repeatable, and verifiable measures of performance for virtualized environments.

Accordingly, there remains a need for workload simulation and benchmarking tools to evaluate the performance of a logically partitioned system.

SUMMARY OF THE INVENTION

Embodiments of the invention provide, among other things, a method, a computer-readable medium, and an apparatus for performing dynamic workload simulations in virtualized environment.

One embodiment provides a method of performing a dynamic workload simulation. The method generally includes initiating a master control driver configured to coordinate the execution of one or more workload drivers on a plurality of logical partitions, wherein each logical partition provides a virtual computing system that operates independently from a collection of physical hardware and independently from other logical partitions. The method generally further includes initiating the execution of the one or more workload drivers on the plurality of logical partitions, wherein each respective workload driver is configured to inject a workload into one of the plurality of logical partitions, and still further includes recording a measure of performance transmitted from each respective workload driver to the master control driver regarding the performance of the workload.

Another embodiment of the invention provides a computer-readable medium containing a program which, when executed, performs operations. The operations may generally include initiating a master control driver configured to coordinate the execution of one or more workload drivers on a plurality of logical partitions, wherein each logical partition provides a virtual computing system that operates independently from a collection of physical hardware and independently from other logical partitions. The operations may generally include initiating the execution of the one or more workload drivers on the plurality of logical partitions, wherein each respective workload driver is configured to inject a workload into one of the plurality of logical partitions, and may further include recording a measure of performance transmitted from each respective workload driver to the master control driver regarding the performance of the workload.

Another embodiment of the invention provides a system for performing a dynamic workload simulation. The system generally includes a virtualized computing system, wherein the computing system comprises a collection of physical hardware allocated to one or more logical partitions, wherein each logical partition provides a virtual computing system that operates independently from a collection of physical hardware provided by a virtualized system and independently from other logical partitions. The system generally further includes a master control driver configured to coordinate the execution of one or more workload drivers in the plurality of logical partitions, wherein each respective workload driver is configured to inject a workload into one of the plurality of logical partitions, and further configured to record a measure of performance transmitted from each respective workload driver to the master control driver regarding the performance of the workload injected into a respective logical partition.

BRIEF DESCRIPTION OF THE DRAWINGS

So that the manner in which the above recited features of the invention can be understood, a more particular description of the invention, briefly summarized above, may be had by reference to the exemplary embodiments that are illustrated in the appended drawings. Note, however, that the appended drawings illustrate only typical embodiments of this invention and should not, therefore, be considered limiting of its scope, for the invention may admit to other equally effective embodiments.

DETAILED DESCRIPTION OF THE PREFERRED EMBODIMENTS

Figure 1:
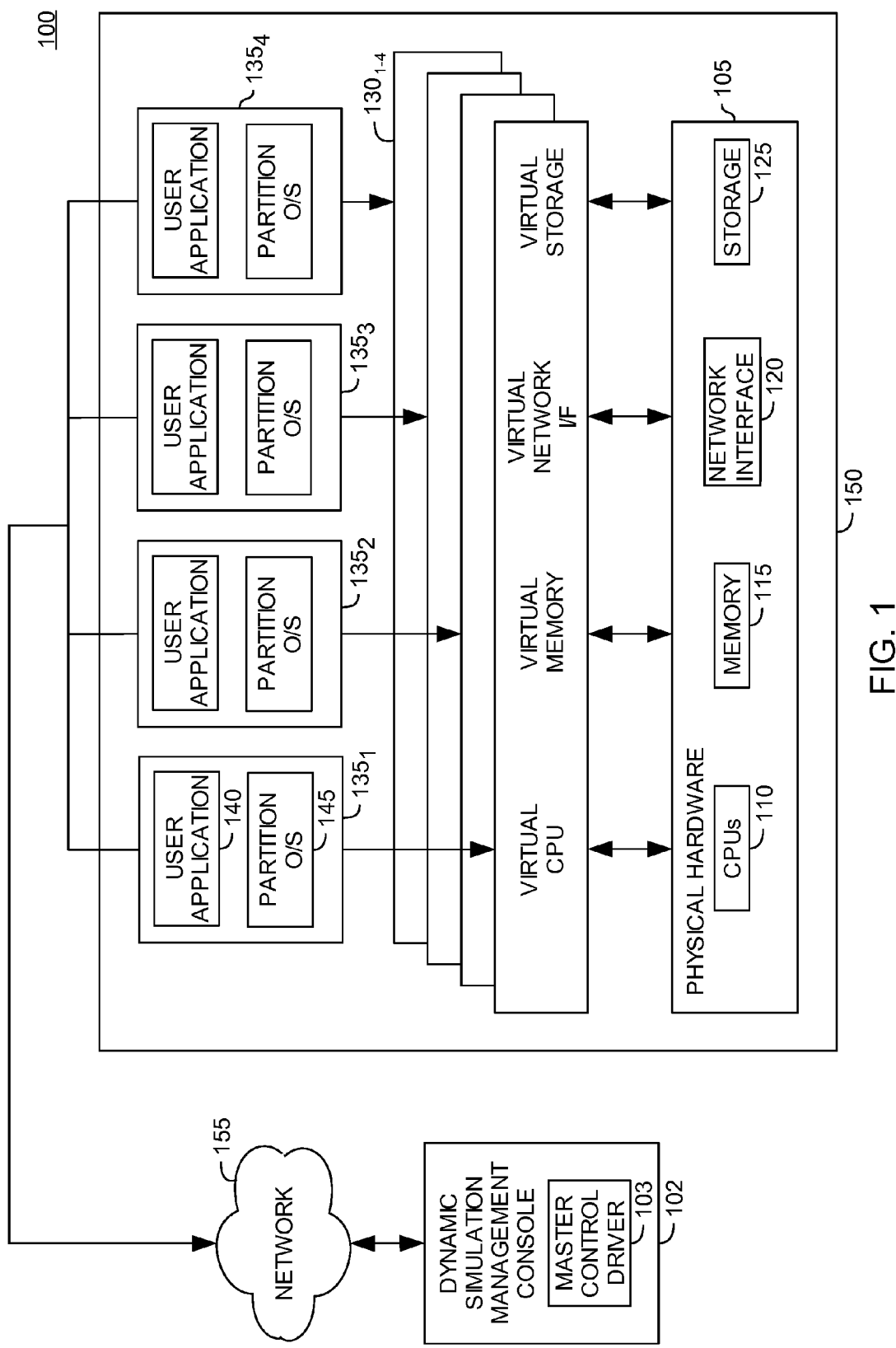
FIG. 1 is a block diagram illustrating logical and physical components of a virtualized system environment, according to one embodiment of the invention.

The present invention generally provides methods for performing dynamic workload simulations in a virtualized environment. In one embodiment, a dynamic simulation may be performed using a master control driver, one or more workload drivers, and data collection routines. Each of these components is described in detail below. Typically, the master control driver orchestrates the performance of the simulation by controlling the one or more workload drivers. Each workload driver includes a sequence of requests, such as commands, I/O operations, and subroutine-library calls that constitute the work being done by a logical partition during a simulation. The workload performed by a driver is configured to be repeatable (i.e., it may be "injected" to a given logical partition many times) and may be used to measure the performance effect of changes to the system, including the concurrent injection of different workloads in different logical partitions.

During a simulation, the master control driver may vary the injection rate used by a given workload driver. Thus, each workload driver may dynamically vary its impact on the system over the course of a simulation. This may result from a system administrator modifying the injection rate using a dynamic workload simulation console. A simulation may be configured in advance and dynamic workload levels may be specified using a configuration file created for a given simulation event. Each workload driver may also be configured with performance data collection routines. Two performance measurements include average response time (i.e., how long to complete a task) and throughput (i.e., a measure of work per unit time).

The following description references embodiments of the invention. The invention, however, is not limited to any specifically described embodiment; rather, any combination of the following features and elements, whether related to a described embodiment or not, implements and practices the invention. Moreover, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative of the invention and are not considered elements or limitations of the appended claims; except where explicitly recited in a claim. Similarly, references to "the invention" should neither be construed as a generalization of any inventive subject matter disclosed herein nor considered an element or limitation of the appended claims; except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of computer-readable media. Illustrative computer-readable media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such computer-readable media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, application programs are described herein using discrete modules or components interacting with one another. Those skilled in the art recognize, however, that different embodiments may combine or merge such components and modules in many different ways.

Furthermore software applications described herein may be configured to execute on existing computer systems, e.g., desktop computers, server computers, laptop computers, tablet computers, and the like. The dynamic performance simulation applications described herein, however, are not limited to use with any particular computing environment, and may be adapted to take advantage of new computing systems as they become available.

FIG. 1 is a block diagram illustrating logical and physical components of a virtualized environment 100, according to one embodiment of the invention. As shown, the virtualized environment 100 includes a dynamic simulation management console 102 and a master control driver 103, and virtualized system 150.

In one embodiment, the virtualized system 150 includes a collection of hardware resources 105 such as one or more physical processors (CPUs) 110, memory 115, network interface 120, and storage 125 (e.g., IDE or SCSI disk systems). The virtualized system 150 includes any suitable type of computer system capable of supporting logical partitioning, such as a network server, mainframe computer, and the like. In one embodiment, the computer system 150 is a Power5 computer system available from International Business Machines (IBM) of Armonk, N.Y. The dynamic workload simulations described herein, however, are not limited to any particular virtualized computing environment, and may be adapted to take advantage of new computing systems that support virtualization, as they become available.

In one embodiment, the system resources 105 may be allocated among the logical partitions 135 according to any suitable allocation arrangement. Each logical partition 135 may be configured using a partition definition 130. The partition definition 130 specifies the resources allocated to a given logical partition 135. Once defined, a logical partition 135 operates as a separate computer system running on the virtual resources allocated to the partition 135.

Underlying the virtual resources 130 and logical partitions 135 are physical hardware resources 105. The partition definition 130 maps the virtual resources assigned to a logical partition 135 to physical hardware 105. Additionally, the underlying resources 105 may be dedicated to a given partition 135, or may be shared. For example, the virtual CPU resources allocated to a partition 135 may map to a dedicated one or more of the system processors 110 or the system processors 110 may be assigned as a resource available to multiple partitions 135. Similarly, other physical resources 105 (e.g., memory 110 network, 120 and storage 125, as well as various other resources, such as I/O devices) may be assigned to the virtual resources of a given logical partition 135, as specified in a partition definition 130.

A partition operating system 145 may be installed and configured to run on each logical partition 135. The operating system 145 for a given partition 135 executes on the virtual resources independently from the underlying physical hardware 105 and other logical partitions 135. Further, user applications 140 executing in a logical partition 135 do so within a particular one of the logical partitions 135 and is said to "execute in the partition", meaning that a user application 140 can access only the virtual resources assigned to the given partition 135, and not resources assigned to others. User applications 140 may include any computer software application available to execute on the partition operating system 145. Thus, applications such as web-servers, databases, graphics rendering engines, compilers, and business office suites, (to name just a few common software applications) may be installed and executed on a logical partition 135. In one embodiment, the user applications 140 may include one or more workload drivers executing on a given partition during the course of a dynamic workload simulation.

The management console 102 and master control driver 103 may be applications executing on one of the partitions 135, or may be executing on a separate computer system. In one embodiment the master control driver 103 provides a software application configured to define, orchestrate and control a dynamic workload simulation performed by virtualized computer system 150. The master control driver 103 may be configured to coordinate and control the injection of workload by a workload driver running in one of the logical partitions 135. As described above, each workload driver specifies a workload to be performed by a logical partition 135 during a simulation. The master control driver 103 may direct a workload driver to "inject" a unit of work, according to an injection rate method, described more fully below. The management console 102 provides an interface that allows a system administrator to initiate, monitor, control and view the results of a given simulation. In one embodiment, the actual simulation may be performed by one or more workload drivers. The interaction between the master control driver 103 and a plurality of workload drivers is described in greater detail below.

Figure 2:
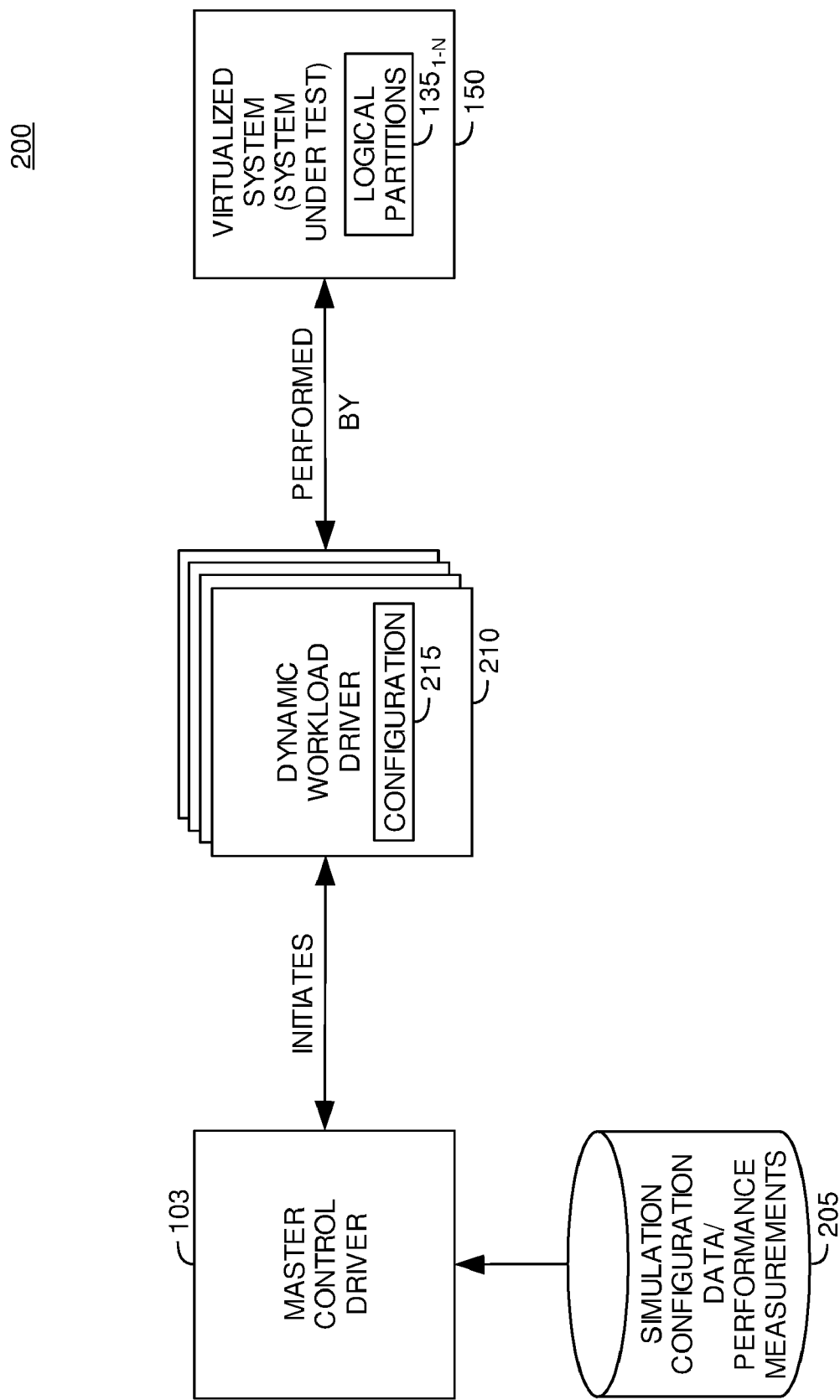
FIG. 2 is a block diagram illustrating exemplary software components used to conduct a dynamic workload simulation, according to one embodiment of the invention.

FIG. 2 is a block diagram illustrating exemplary software components used to perform a dynamic workload simulation on a virtualized system 150, according to one embodiment of the invention. In one embodiment, a dynamic workload simulation may be performed using a master control driver 103 configured to initiate one or more dynamic workload drivers 210 on the logical partitions 135. The configuration data 205 may provide a script of what actions will be performed during the simulation. More specifically, the configuration data 205 may specify which workload drivers 210 will be initiated, which partitions the workload drivers 210 will be initiated on, and the sequence in which they are initiated. The master control driver 103 may initiate workloads that run asynchronously to one another (i.e., a first set of workload drivers must complete, before a second group is initiated), and also workloads that run synchronously to one another during a given simulation.

Figure 4A:
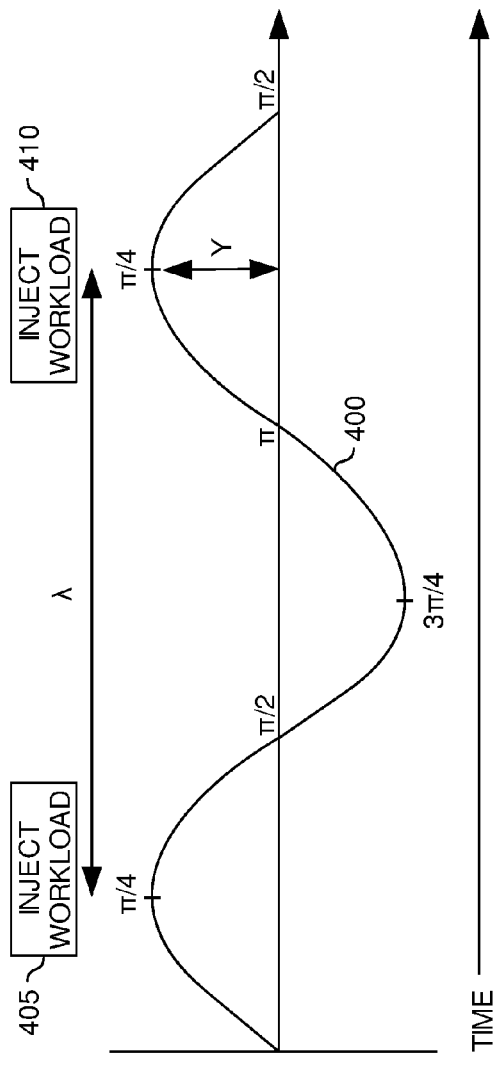
FIG. 4A illustrates a trigonometric injection rate method used to control workload activity of a workload driver, according to one embodiment of the invention.

Additionally, configuration data 205 may specify an "injection rate method" that indicates a rate at which the workload activity of a workload driver 210 will be "injected" into a logical partition 135. In other words, the injection rate method may be used to specify how a workload driver 210 will determine when to perform the sequence of actions associated with that particular workload driver 210. The injection rate for a given workload may vary during a simulation, according to messages received from master control driver 103. Two exemplary injection rate methods are described below in reference to FIGS. 4A and 4B.

In one embodiment, the workload activity performed by a given workload driver 210 may include performing a known benchmark such as LINPACK benchmark (used to measure how quickly a partition can solve a dense systems of linear equations), or by performing a known benchmark calculation such as calculating the millions of floating point operations per second ("MFLOPS") capability of a given logical partition 135. However, any appropriate performance benchmark may be performed by a workload driver 210.

In another embodiment, the workload driver may provide a scripted sequence of actions, routines, or calls to perform on the partition 135. For example, a workload driver 210 may be configured to perform a sequence of database calls that may be expected of the partition 135 in a production environment, or place a predetermined load on a server process running on the partition 135. By simulating the actions of production applications, the expected performance of the virtualized system 150 may be demonstrated. Further, because the master control driver 103 orchestrates the activity across all the partitions 135 of a virtualized system 150, dynamic simulations may be repeated and verified, without trying to reproduce a series of ad-hoc simulations performed individually on each partition 135.

Furthermore, a dynamic simulation may include a suite of workload drivers 210 that perform a combination of benchmark profiles and scripted system activity. For example, while a first partition $135_1$ is executing a sequence of database calls (specified by one workload driver 210), the master control driver 103 may initiate another workload driver 210 configured to perform a benchmark test (e.g., the LINPAK benchmark) on a second partition $135_2$. By performing the same benchmark both before and after the workload driver 210 running on the first partition 135 has completed the sequence of database calls, differences in performance may be clearly observed and calculated across all the partitions 135 of a virtualized system 150.

As described above, the master control driver 103 orchestrates a dynamic simulation by initiating one or more given workload drivers 210, and the workload drivers 210 may be configured to perform a task on a specified partition 135. The workload drivers 210 may be further configured to collect and transmit performance data back to the master control driver 103. For example, each logical partition 135 may communicate with the master control driver 103 using a network address assigned to a virtual network interface. Thus, message passing between a workload driver 210 running on logical partition 135 and master control driver 103 may occur using known network communication protocols (e.g., the TCP/IP protocol suite).

In one embodiment, the performance data gathered by workload drivers 210 may include average response time data and throughput data collected for the workloads injected into a logical partition 135. The average response time indicates how long a given partition required to complete to a task. Throughput may be reported as a ratio of how many units of workload a given partition 135 was able to complete per a given period of time. However, embodiments of the invention may be configured to gather any performance data, either for the logical partition 135, or for the virtualized system 150, as required to characterize the performance of the logical partitions 135 and system 150 during a given dynamic workload simulation. In one embodiment, the average response time and throughput data may be written to a log file maintained by workload driver 210 that is transmitted to the master control driver 103 after a workload driver completes, or in near-real time during a given dynamic simulation, as needed.

Figure 3:
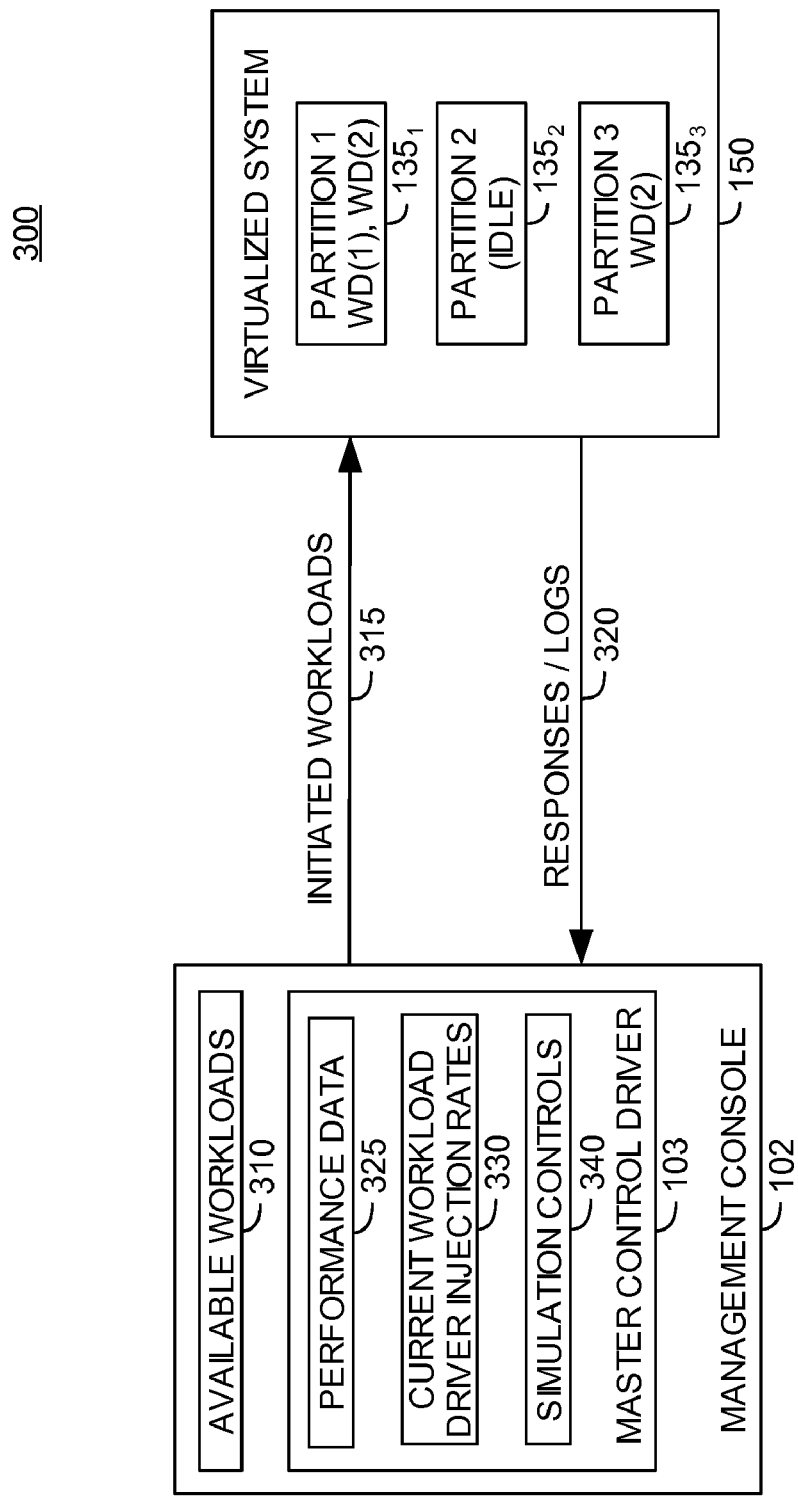
FIG. 3 is a block diagram illustrating a master control driver performing a dynamic workload simulation, according to one embodiment of the invention.

FIG. 3 is a block diagram illustrating a master control driver 103 in the course of performing a dynamic workload simulation, according to one embodiment of the invention. As described above, the master control driver 103 initiates one or more workload drivers 210 on logical partitions 135. Illustratively, virtualized system 150 includes three partitions $135_{1-3}$ labeled, partition 1, partition 2, and partition 3. As illustrated, the master control driver 103 has initiated instances of workload drivers WD(1) and WD(2) on partition 1. Accordingly, the workload associated with these two workload drivers is being injected into partition 1, according to the injection rate method specified for WD(1) and WD(2). At the same time, master control driver 103 has initiated an instance of WD(2) on partition 3. Partition 2 is shown in an idle state, meaning no workload has been injected into partition 2.

During the simulation, the management console 102 may be used to observe the progress of the simulation. As the workload drivers 210 inject workloads into the partitions 135, performance data 325 may be collected and transmitted from the various workload drivers 210 to the master control driver 103. In addition, the management console 102 may allow a system administrator to dynamically modify the workload drivers 210 initiated on the virtualized system 150 or to modify the injection rate 325 set for a given workload driver 210. The available workloads 310 represent a suite of workload drivers that may be available to initiate on the partitions 135. Simulation controls 340 may provide the appropriate graphical or text-based interface that allows a system administrator to conduct a simulation.

Additionally, in one embodiment, the master control driver 103 may be configured to control the current injection rates 325 of the workload drivers 210 operating on partitions 135. By changing the injection rate of a given workload driver 210, the load placed on each individual partition 135 may be dynamically modified during the course of the simulation. Thus, a system administrator may simulate a wide variety of scenarios to test the performance of virtualized system 150 by modifying both the types of workload drivers 210 initiated in the partitions 135, along with the workload injection rates used by each of the workload drivers. Furthermore, because the workload drivers 230 and injection rates 325 may be fully characterized before beginning a simulation, the performance measurements obtained during a simulation may be easily repeated or verified.

In one embodiment, the injection rate method and values associated with that method for each workload driver 210 may be determined from configuration values 215. Two injection rate methods include the sine wave method and square wave method. Depending on the workload activity specified for a given workload driver 210, either of these injection rate methods may be appropriate. However, embodiments of the invention are not limited to sine wave and square wave injection rate methods, and other injection rate methods may be used.

FIG. 4 provides a graphical representation of a sine wave injection rate method. In one embodiment, the sine-wave injection rate method may be performed by software routines that are included with a workload driver 210. The routines may be configured to calculate continuous values obtained from the trigonometric sine function. Because sine wave values may be calculated with little overhead, the impact from these calculations during a dynamic simulation is minimal. Furthermore, the performance of the system 150 for different levels of workload activity may be easily obtained by modifying configuration values for the sine wave 400. For example, by modifying values representing the amplitude, frequency and phase of the sine wave 400, the injection rate for the workload driver may be dynamically modified during a running simulation. As shown in FIG. 4 the sine wave 400 peaks twice within the illustrated time frame. Accordingly, a first workload is injected at the first peak 405, and a second workload is injected at second peak 410. As the workload driver continues to calculate the sine wave values, additional workload injections will occur.

Figure 4B:
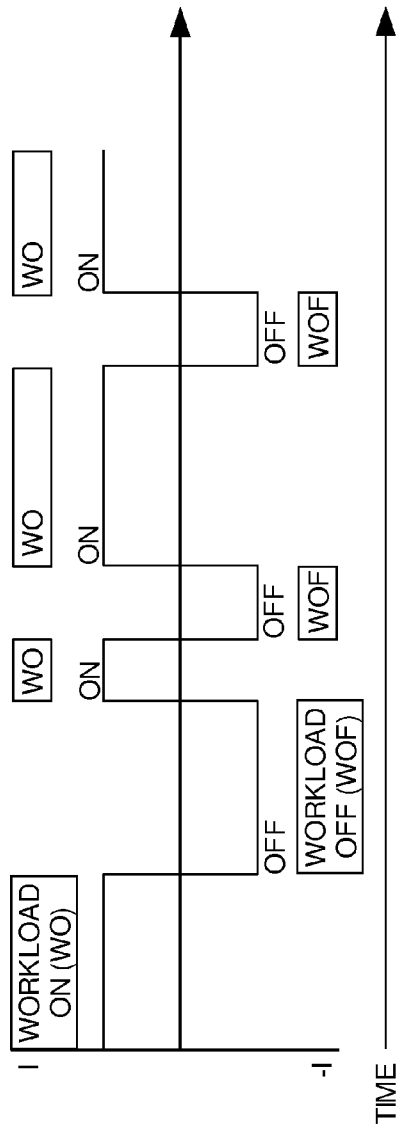
FIG. 4B illustrates a square-wave injection rate method, used to toggle the state of a workload driver, according to one embodiment of the invention.

FIG. 4B illustrates a square wave injection method 450. Like the sine wave injection rate method 400, the square wave injection rate method may be calculated using software routines performed by the workload driver 210. The square wave injection method 450 may be appropriate for controlling a workload driver desired to either be "on" or "off" during the course of a dynamic simulation. For example, a partition 135 may be configured as a server system expected to receives client requests (e.g., HTTP web-page "get-page request") at some average rate. If the average rate represents historical peak rates experienced by an e-commerce provider, the dynamic simulation may be used to measure performance of the system 150 under an expected peak demand load. A workload driver configured to inject workload using the square wave injection rate method may continuously inject requests at the historical peak rate, so long as the square wave 400 is in an "on" state. When the value of the square wave 400 transitions to an "off" state the workload driver 210 may be configured to cease generating requests. Thus, the square wave 400 allows a dynamic simulation to set different workload drivers 210 to an "on" or "off" state during the course of the simulation.

Figure 5:
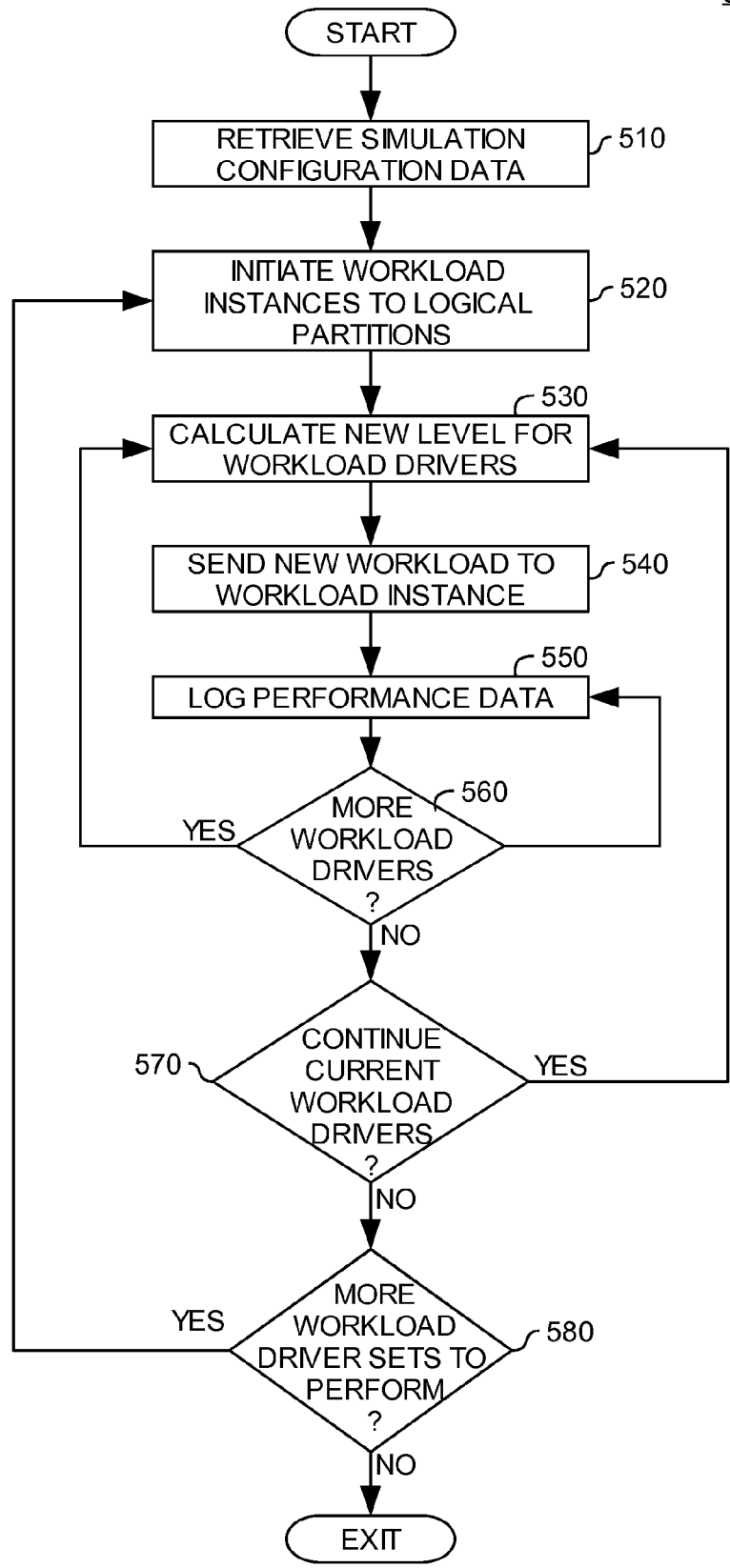
FIG. 5 illustrates a method for performing a dynamic workload simulation on a virtualized system, according to one embodiment of the invention.

FIG. 5 illustrates a method for performing a dynamic workload simulation on a virtualized system 150, according to one embodiment of the invention. The method 500 begins at step 510 when the master control driver 103 retrieves configuration data 205 specifying which workload drivers 210 to initiate during the course of a dynamic simulation. At step 520, the master control driver 103 may initiate the workload drivers 210 specified in the configuration file 205 on the logical partitions 135. In response, the workload drivers 210 begin injecting respective workloads into the partition 135 according to the injection rate method and workload injection rate specified by workload configuration 215. Once all of the workload drivers 210 are initiated and injecting workloads, the dynamic simulation is underway. Each partition 135 may be performing some scripted activity, or calculating benchmark values, as directed by a workload driver 210. As this occurs, the workload drivers 210 may collect performance data (e.g., average response time and throughput).

At step 530, over the course of a simulation, the master control driver 103 may be configured to calculate a new injection rate for at least some of the workload drivers 210 currently initiated and injecting workloads within partitions 135. For example, the simulation configuration data 205 may specify that the injection rate for a given workload should steadily increase, or a system administrator may choose to dynamically modify an injection rate over the course of a simulation. At step 540, a new workload injection rate may be transmitted to one of the workload drivers 210 currently running on a partition 135. At step 550, the master control driver 103 may determine whether the injection rate for another workload driver 210 should be modified. If so, the method returns to step 530 and steps 530 and 540 may be repeated.

At step 560, the master control driver records any performance data obtained from a workload driver 210. At step 570, the master control driver 103 may determine whether a current collection of workloads should continue injecting work into the partitions 135. For example, a dynamic simulation may be configured to collect a certain amount of performance data, or may be configured to run for a predetermined period of time. If determined affirmatively, then the method 500 may return to step 530, where the workloads currently initiated may continue to inject work, and wherein the injection rate method set for a given workload driver 210 may be modified, as part of steps 530 and 540.

Otherwise, if a current set of workload activity is complete, then at step 580, the master control driver 103 may be configured to determine if there are additional workloads to be performed as part of a dynamic simulation. If so, then the method 500 may return to step 520 and initiate additional sets of workload drivers 210 on partitions 135. After the master control driver 103 has initiated all of the workload drivers and collected performance data, as specified for a given dynamic simulation, the method 500 terminates.

Figure 6:
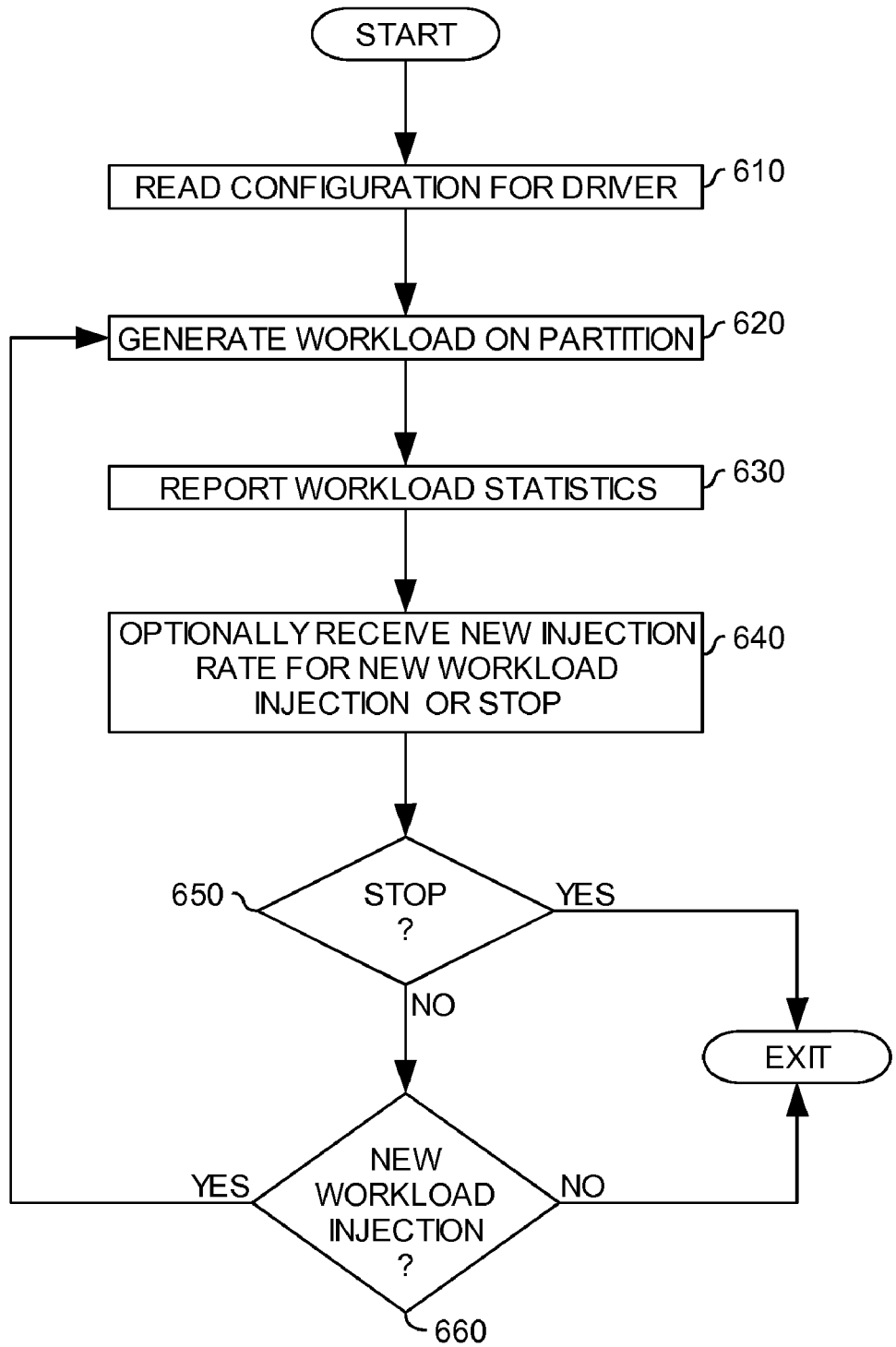
FIG. 6 illustrates the operations of a workload driver during a dynamic workload simulation on a virtualized system, according to one embodiment of the invention.

FIG. 6 illustrates the operations of a workload driver during a dynamic workload simulation on a virtualized system, according to one embodiment of the invention. At step 610, an instance of the workload driver is initiated on a logical partition 135, according to configuration data 215 specified for the driver. For example, the configuration data 215 may indicate the workload performed for a given workload driver 210, along with values indicating an injection rate method, what performance data to collect, and the like. At step 620, once initiated, the workload driver 210 begins to inject workload into a given logical partition 135. As the logical partition performs the injected workload, the workload driver 210 gathers performance data at step 630. Steps 620 and 630 may be repeated until the workload driver receives a new workload injection rate, or completes a set of tasks specified for the workload driver 210. Thus at step 640, the workload driver 210 may modify a current injection rate. In one embodiment, the master control driver 103 may be configured to transmit a new injection rate during the course of a simulation. If the workload driver 210 completes all of the actions specified for the driver, then at step 650, the workload driver 210 may cease injecting workload into a given partition 135.

Otherwise, at step 660, the workload driver 210 determines whether a next workload should be generated and injected. For example, using a sine-wave injection rate method, the workload driver may pause until the value of a sine wave reaches one before injecting another workload. Alternatively, if using a square wave injection method, so long as the square wave is set to an "on" state, then step at 660 will be answered affirmative and the method returns to step 620. In this case, workload will continue to be generated and injected until the workload driver receives an injection rate message setting the square wave to "off" state.

As described above, embodiments of the invention may be used to improve the quality of dynamic simulations performed against virtualized system 150, to implement marketing demonstrations of virtualization functionality, and to provide for customer verification of the performance characteristics a virtualized system 150.

Embodiments of the invention provide a master control driver 103 configured to orchestrate the activity of one or more workload drivers 210. The master control driver 103 coordinates dynamic variations in the injection rate of a controllable workload against multiple logical partitions 135 in a virtualized system 150. Further, the master control driver 103 allows a system administrator to initiate and control multiple workload drivers 210 from a single management console 102. During the course of a dynamic simulation, embodiments of the invention may be configured to control the dynamics within each workload via sine and square wave insertion methods. This allows the controlled injection of workloads processed by real-world business applications, along with the calculation of industry standard benchmarks. For example, the master control driver 103 allows a system administrator to demonstrate the performance of a collection of logical partitions 135, as well as the ability to record and analyze the results from workloads initiated within one logical partition 135, in relation to workloads performed in others. Because the actions of each logical partition 135 may be centrally controlled, embodiments of the invention allow users to create reproducible simulations in the dynamic environment of a virtualized system 150.

While the foregoing is directed to embodiments of the present invention, other and further embodiments of the invention may be devised without departing from the basic scope thereof, and the scope thereof is determined by the claims that follow.

What is claimed is:

1. A computer-implemented method of performing a dynamic workload simulation, comprising:
    initiating a master control driver configured to coordinate the execution of one or more workload drivers on a plurality of logical partitions, wherein each logical partition provides a virtual computing system that operates independently from a collection of physical computing hardware and independently from other logical partitions;

initiating the execution of the one or more workload drivers, wherein each respective workload driver is configured to inject a workload into one of the plurality of logical partitions; and recording a measure of performance transmitted from each respective workload driver to the master control driver regarding the performance of the workload.

2. The method of claim 1, further comprising, after initiating the execution of the one or more workload drivers, injecting the workload for each respective workload driver according to an injection rate method.

3. The method of claim 2 wherein the workload comprises, performing a scripted sequence of actions directed to applications running on the respective logical partition.

4. The method of claim 3, wherein the sequence of actions comprises performing at least one or more queries directed to a database management system running on the respective logical partition.

5. The method of claim 3, wherein the sequence of actions comprises a plurality of requests, generated at a rate specified by the injection rate method, to a server application running on the respective logical partition.

6. The method of claim 2, wherein the injection rate method for the respective workload driver is configured to inject workload into the respective logical partition based on values calculated from a continuous function.

7. The method of claim 2, wherein the injection rate method is configured to inject workload into a respective logical partition so long as the value of a square wave is determined to be in an "on" state.

8. A computer-readable storage medium storing a program which, when executed, performs operations, comprising:

initiating a master control driver configured to coordinate the execution of one or more workload drivers on a plurality of logical partitions, wherein each logical partition provides a virtual computing system that operates independently from a collection of physical computing hardware and independently from other logical partitions;

initiating the execution of the one or more workload drivers, wherein each respective workload driver is configured to inject a workload into one of the plurality of logical partitions; and recording a measure of performance transmitted from each respective workload driver to the master control driver regarding the performance of the workload injected into a respective logical partition.

9. The computer-readable storage medium of claim 8, wherein the operations further comprise, after initiating the execution of the one or more workload drivers, injecting the workload for each respective workload driver according to an injection rate method.

10. The computer-readable storage medium of claim 9 wherein the workload comprises, performing a scripted sequence of actions directed to applications running on the respective logical partition.

11. The computer-readable storage medium of claim 10, wherein the sequence of actions comprises performing at least one or more queries directed to a database management system running on the respective logical partition.

12. The computer-readable storage medium of claim 10, wherein the sequence of actions comprises a plurality of requests, generated at a rate specified by the injection rate method, to a server application running on the respective logical partition.

13. The computer-readable storage medium of claim 9, wherein the injection rate method for the respective workload driver is configured to inject workload into the respective logical partition based on values calculated from a continuous function.

14. The computer-readable storage medium of claim 9, wherein the injection rate method is configured to inject workload into a respective logical partition so long as the value of a square wave is determined to be in an "on" state.

15. A system for performing a dynamic workload simulation, comprising:

a virtualized computing system, wherein the computing system comprises a collection of physical hardware allocated to one or more logical partitions, wherein each logical partition provides a virtual computing system that operates independently from a collection of physical hardware provided by a virtualized system and independently from other logical partitions; and a master control driver configured to coordinate the execution of one or more workload drivers in the plurality of logical partitions, wherein each respective workload driver is configured to inject a workload into one of the plurality of logical partitions, and further configured to record a measure of performance transmitted from each respective workload driver to the master control driver regarding the performance of the workload injected into a respective logical partition.

16. The system of claim 15, once initiated by the master control driver, each of the one or more workload drivers is configured to inject the workload into the respective logical partition, according to an injection rate method.

* * * * *